US012530612B2

(12) United States Patent
Guimarães Silverio et al.

(10) Patent No.: US 12,530,612 B2
(45) Date of Patent: Jan. 20, 2026

(54) METHODS FOR ALLOCATING LOGICAL QUBITS OF A QUANTUM ALGORITHM IN A QUANTUM PROCESSOR (71) Applicant: PASQAL, Massy (FR)

(72) Inventors: Henrique Guimarães Silverio, Palaiseau (FR); Loïc Henriet, Nantes (FR)

(73) Assignee: PASQAL, Palaiseau (FR)

( * ) Notice: Subject to any disclaimer, the term of this patent is extended or adjusted under 35 U.S.C. 154(b) by 555 days.

(21) Appl. No.: 18/017,589

(22) PCT Filed: Jul. 21, 2021

(86) PCT No.: PCT/EP2021/070395
§ 371 (c)(1),
(2) Date: Jan. 23, 2023

(87) PCT Pub. No.: WO2022/018140
PCT Pub. Date: Jan. 27, 2022

(65) Prior Publication Data
US 2023/0274176 A1 Aug. 31, 2023

(30) Foreign Application Priority Data

Jul. 24, 2020 (FR) ...................................... 2007848

(51) Int. Cl.
*G06N 10/60* (2022.01)
*G06N 10/20* (2022.01)
(52) U.S. Cl.
CPC ............. *G06N 10/60* (2022.01); *G06N 10/20* (2022.01)

(58) Field of Classification Search
CPC ........ G06N 10/00; G06N 10/20; G06N 10/40; G06N 10/60; G06N 10/70; G06N 10/80
See application file for complete search history.

(56) References Cited

U.S. PATENT DOCUMENTS 10,657,304 B1 * 5/2020 Itoko ...................... G06F 30/327
2020/0125985 A1 * 4/2020 Narang .................. G06N 10/60

OTHER PUBLICATIONS

NPL Gambetta Building logical qubits 2017.*
(Continued)

*Primary Examiner* — Paul M Knight
(74) *Attorney, Agent, or Firm* — NIXON & VANDERHYE (57) ABSTRACT According to one aspect, the subject matter of the present description is a method for allocating logical qubits of a quantum algorithm to physical qubits of a quantum processor arranged according to a given architecture, the method including: establishing, from the architecture, a connectivity graph; the establishing, from the quantum algorithm, a graph of the logical operations; assigning a weight to each logical qubit; ranking the logical qubits according to the weight; allocating a first logical qubit chosen according to the weight, to a first physical qubit of the quantum register; iteratively allocating the logical qubits remaining to be allocated, including calculating a score; and reproducing the iterative allocation procedure until allocating the last logical qubit remaining to be allocated, thus resulting in obtaining a configuration for allocating logical qubits of the quantum algorithm to physical qubits of the quantum processor.

20 Claims, 5 Drawing Sheets (56) References Cited

OTHER PUBLICATIONS

NPL Henriet Q Computing wtih Neural Atoms Inventor Pub Sep. 2020.*
NPL Jiang Towards Scalable Quantum Communication and Computation 2009.*
NPL Kumar Neutral Atom Quantum Computing 2019.*
NPL Litinski A Game of Surface Codes 2019.*
NPL Mills Application Motivated Holistic Benchmarking Mar. 2021.*
NPL Nam Low cost quantum circuits for classically intractable instances 2019.*
NPL Pedersen Neutral Atom Quantum Computing with Rydberg 2008.*
NPL Saffman Quantum computing with neutral atoms 2019.*
NPL Siraichi Qubit Allocation 2018.*
Loic Henriet, et al., "Quantum computing with neutral atoms", arxiy.org, Cornell University Library, 201 Olin Library, vol. 4, Jun. 22, 2020, p. 327 (Submission Pending).
Marcos Yukio Siraichi, et al., "Qubit allocation", Proceedings of the 2018 International Symposium on Code Generation and Optimization, Feb. 24, 2018, pp. 113-125 (Submission Pending).
International Search Report for PCT/EP2021/070395 dated Oct. 27, 2021, 7 pages.
Written Opinion of the ISA for PCT/EP2021/070395 dated Oct. 27, 2021, 7 pages.
Henriet et al., "Quantum computing with neutral atoms," arXiv.org, 2020, 34 pages.
Siraichi et al., "Qubit Allocation," Proceedings of the 2018 International Symposium on Code Generation and Optimization (CGO), Feb. 24-28, 2018, 13 pages.

* cited by examiner

METHODS FOR ALLOCATING LOGICAL QUBITS OF A QUANTUM ALGORITHM IN A QUANTUM PROCESSOR

CROSS-REFERENCE TO RELATED APPLICATIONS

This application is the U.S. national phase of International Application No. PCT/EP2021/070395 filed Jul. 21, 2021 which designated the U.S. and claims priority to FR Patent Application No. 2007848 filed Jul. 24, 2020, the entire contents of each of which are hereby incorporated by reference.

TECHNICAL FIELD OF THE INVENTION

The present description relates to methods of allocating logical qubits of a quantum algorithm in a quantum processor and more precisely to methods of allocating logical qubits of a quantum algorithm in a neutral-atom quantum processor.

PRIOR ART

The present description relates to the field of processors allowing quantum processing of information to be performed, or quantum processors. Quantum information processing is an active field because of the multiple applications which can benefit from the performance the field promises, in particular data-intensive computing in chemistry, biochemistry, materials science, machine learning, combinatorial computing or cryptography.

To process data, a quantum processor uses quantum algorithms which are successions of quantum logical operations performed on logical qubits. An example of a quantum algorithm is the Deutsch-Jozsa algorithm and an example of a quantum logical operation is the CNOT (controlled not) operation.

Logical qubits are the quantum equivalent of bits used in algorithms for classical information processing, and quantum logical operations are the quantum equivalent of binary logical operations performed on bits, such as an "AND" or "NOT" operation.

Hereinafter in the description, the term "quantum logical gate" will refer to such a quantum logical operation and the term "collective quantum logical gate" will refer to a quantum logical gate involving at least two distinct logical qubits.

For characterizing a quantum algorithm, it is known how to establish a "graph of logical operations" the nodes of which represent the logical qubits involved in the quantum algorithm and the links of which represent the collective quantum logical gates between the logical qubits.

In practice, the quantum algorithm is physically implemented in the quantum processor through interactions between physical entities (e.g. neutral atoms, ions or superconducting circuits), referred to as "physical qubits" in the present description.

To implement a quantum algorithm in a quantum processor, it is thus useful to choose, for each logical qubit of the algorithm, a particular physical qubit on which interactions corresponding to logical operations involving said logical qubit in the algorithm will be physically performed. Such choice of a correspondence between a logical qubit of the algorithm and a physical qubit of the processor is known as the "allocation" of said logical qubit to said physical qubit.

Thereby, allocating multiple logical qubits of the algorithm to multiple physical qubits of the processor results in an "allocation configuration".

The physical qubits of a quantum processor are spatially arranged according to a given architecture. The term "quantum register" is used for defining said set of physical qubits arranged according to said architecture and which can be handled individually. The architecture brings constraints for the allocation of logical qubits because the interactions between physical qubits, making it possible to produce the effect of a collective gate, in practice, can only take place if the physical qubits meet certain criteria, like e.g. a maximum distance between physical qubits or the existence of a physical connection between physical qubits.

To translate the constraints related to the architecture of a quantum register, it is known how to establish a "connectivity graph" the nodes of which represent the physical qubits of the processor and the links of which represent the possibility of interaction between physical qubits allowing a collective gate to be produced in practice.

In this connectivity graph, only the existence of a link between two nodes indicates that the physical qubits corresponding to said nodes can interact so as to produce in practice the effect of a collective gate.

To make unconnected physical qubits interact in the connectivity graph, it is possible to use a plurality of intermediate interactions, called exchange operations, involving connected physical qubits which act as relays for an interaction between unconnected physical qubits. In practice, the exchange operation is a collective quantum logical gate which exchanges the quantum state of two physical qubits.

Thus, in the document by Henriet et al. ("*Quantum computing with neutral atoms*", Quantum. vol. 4, p. 327, 2020), a method is proposed wherein logical qubits are allocated to positions of a layout of physical qubits, and then exchange operations are introduced in order to be able to make remote physical qubits interact which cannot produce the effect of a collective gate. However, such a method does not describe how to minimize the number of exchange operations in an allocation configuration in practice.

However, the use of exchange operations increases the total number of interactions between physical qubits which occur during the implementation of a given quantum algorithm, which increases the risk of error in the quantum algorithm, i.e. the risk that the quantum algorithm, once implemented in a quantum processor, will give an erroneous result.

Thereby, not all configurations for allocating the logical qubits of a given quantum algorithm to the physical qubits of a quantum processor of a given architecture, are equivalent in terms of risk of error.

It is thus desirable to find allocation methods for reducing the number of exchange operations when implementing a given quantum algorithm in a given quantum processor.

In the document by Siraichi et al. ("*Qubit Allocation*" in *Proceedings of the* 2018 *International Symposium on Code Generation and Optimization.* 2018. p. 113-125), an exact allocation method is proposed. The method provides an exact solution which solves the allocation problem by calculating all possible allocation configurations and by choosing the configuration with the least amount of exchanges.

However, the method described has an exponential time complexity with regard to the number of logical qubits of the algorithm, which means that an execution time for the method increases exponentially with the number of logical qubits of the algorithm to be allocated. The above makes the described method incompatible with allocating more than about 8 logical qubits in the quantum register because a too long calculation time (e.g. several days) would be required.

In the same document, another method is proposed, which is heuristic (non-exact) and has a polynomial time complexity. In particular, the method can be used for solving the problem of allocation for a number of logical qubits greater than 8, in a reasonable time, e.g. a few hours. The method described is only suitable for the particular case of directed connectivity graphs which apply exclusively to quantum processors with superconducting circuits. Moreover, the method described is deterministic and thus gives only one possible configuration for the allocation of the logical qubits of a given quantum algorithm to the physical qubits of a given connectivity graph.

Patent application US20200125985 describes a hybrid method of allocating logical qubits, combining deterministic steps of finding an exact solution and a simulated annealing procedure comprising a random character.

The hybrid method can be used for obtaining a plurality of possible configurations for the allocation of the logical qubits of a given quantum algorithm to the physical qubits of a given connectivity graph and for choosing the configuration with the fewest exchange operations. However, the method used is also optimized therein for directed connectivity graphs which apply exclusively to quantum processors with superconducting circuits.

There is thus a need for a method of allocating the logical qubits of a quantum algorithm to the logical qubits of a quantum processor which minimizes the number of exchange gates of the allocation configuration while presenting a time complexity compatible with the allocation of a large number of logical qubits, typically a number greater than or equal to 50.

SUMMARY OF THE INVENTION

In the present description, the term "comprise" means the same thing as "include" or "contain", and is inclusive or open and does not exclude other elements which are not described nor depicted.

Furthermore, in the present description, the term "approximately" or "substantially" is synonymous with (means the same as) a lower and/or upper margin of 10%, e.g. 5%, of the respective value.

In the present description, the terms "quantum logical operation"; "logical operation", "quantum logical gate" and "logical gate" are used interchangeably.

In the present description, the terms "physical qubits", "physical qubits of the quantum processor" or "physical qubits of the quantum register" are used interchangeably. In the present description, an allocated logical qubit is a logical qubit which has been allocated to a physical qubit.

In the present description, an allocated physical qubit is a physical qubit to which a logical qubit has been allocated.

According to a first aspect, the present description relates to a method for allocating logical qubits of a quantum algorithm to physical qubits of a quantum processor arranged according to a given architecture, said method comprising:

the establishment, from said architecture, of a connectivity graph, each node of said graph representing a position of a physical qubit and each link representing a possibility of interaction between two physical qubits;
the establishment, from said quantum algorithm, of a graph of logical operations, each node of said graph representing a logical qubit and each link of said graph representing a quantum logical gate between two logical qubits;
the assignment of a weight to each logical qubit of said graph of logical operations, determined according to the total number of logical gates involving said logical qubit;
the ranking of logical qubits according to weight;
the allocation of a first logical qubit to a first physical qubit of the quantum processor, said first logical qubit being chosen by a first random choice favoring a logical qubit having the greatest weight;
an iterative procedure for allocating the logical qubits remaining to be allocated, comprising:
the selection of candidate logical qubits, said candidate logical qubits being, among the logical qubits remaining to be allocated, logical qubits linked in the graph of logical operations to at least one of the already allocated logical qubits;
the selection of candidate physical qubits, said candidate physical qubits being, among the physical qubits remaining to be allocated, physical qubits linked in the connectivity graph to at least one of the already allocated physical qubits;
for each pair of candidate logical qubit and candidate physical qubit, the calculation of a score, each score being determined, for a possible allocation of said candidate logical qubit to said candidate physical qubit, by the number of logical operations between said candidate logical qubit and the logical qubits already allocated to the physical qubits linked in the connectivity graph to said candidate physical qubit;
the ranking of pairs of candidate logical qubits and candidate physical qubits according to the score; and
the allocation of a logical qubit to a physical qubit, said logical qubit and said physical qubit being selected by a second random selection favoring the candidate logical qubit and the candidate physical qubit of a pair of candidate physical qubit and candidate logical qubit having a higher score among said pairs of candidate logical qubits and candidate physical qubits;
the reproduction of said iterative allocation procedure until the allocation of the last logical qubit remaining to be allocated, thus resulting in producing a configuration for allocating logical qubits of the quantum algorithm to physical qubits of the quantum processor.

According to one or a plurality of embodiments, the ranking of the logical qubits according to weight is a ranking in descending order of weight.

According to one or a plurality of embodiments, the ranking of the pairs of candidate logical qubits and candidate physical qubits according to the score is a ranking in descending order of score.

With the method according to the first aspect, it is possible to allocate all the logical qubits of a quantum algorithm or to allocate only a plurality of logical qubits of the quantum algorithm among the logical qubits of the quantum algorithm. In particular, the applicant has observed that it can be advantageous to allocate only a plurality of logical qubits so that the allocation of the plurality of logical qubits is not subject to constraints imposed by the other logical qubits of the algorithm.

In a case where it is desired to allocate all the logical qubits of the algorithm, the iterative allocation procedure is repeated until the last logical qubit of the quantum algorithm is allocated.

In a case where it is desired to allocate only a plurality of logical qubits among the logical qubits of the quantum algorithm, the iterative allocation procedure is repeated until the last logical qubit of said plurality of logical qubits is allocated.

With the method according to the first aspect, the applicant has shown that it is possible to obtain an allocation configuration with a reduced number of exchange operations. The above is made possible in particular by establishing the score for each pair of candidate logical qubits and candidate physical qubits, said score being established at each iteration of the iterative allocation procedure. Such a score makes it possible to predict the exchange operations that it would be necessary to introduce for each possible allocation and thus to choose, at each iteration, the allocation which introduces the fewest exchange operations in order to end up at an allocation configuration which includes a reduced number of exchange operations.

Allocation methods are generally characterized by a time complexity. A method e.g. with a polynomial or exponential time complexity with regard to the number of logical qubits of an algorithm indicates that an execution time for the method increases polynomially or exponentially with the number of logical qubits to be allocated.

The applicant has shown that the allocation method according to the present description has an execution time increasing polynomially with the number of logical qubits of the algorithm. In this way it is possible to allocate the logical qubits of an algorithm comprising a large number of logical qubits, typically more than 8 logical qubits, or even more than 50, with a calculation time of less than a few days, advantageously less than a few hours.

According to one or a plurality of embodiments, the method further comprises, after the allocation of the last logical qubit, the calculation of a number of exchange operations from said allocation configuration.

The number of exchange operations makes it possible to characterize the efficiency of an allocation configuration obtained with the method according to the present description. In this way it is also possible to compare the efficiency of the method according to the present description with other methods of the prior art.

According to one or a plurality of embodiments, steps comprising the allocation of a first logical qubit, the iterative procedure of allocating the logical qubits remaining to be allocated and the calculation of a number of exchange operations are repeated several times so as to obtain a plurality of allocation configurations each with a number of exchange operations, the method further comprising:
the choice of a configuration having a smaller number of exchange operations among said plurality of allocation configurations.

The applicant has shown that the combination of the repetition of said steps and the random character (also referred to as non-deterministic in the present description) of the choices used in steps of the allocation method according to the present description, make it possible to obtain a final allocation configuration which can be different each time the method is implemented for the same quantum algorithm and the same quantum register.

It is therefore possible to repeat the method, or steps of the method, several times so as to obtain a plurality of final allocation configurations with different numbers of exchange operations, then to advantageously choose the configuration with the smallest number of exchange operations.

According to one or a plurality of embodiments, the method further comprises, after the allocation of the last logical qubit, the calculation of a fidelity of the quantum algorithm for said allocation configuration.

The fidelity (or "quantum fidelity") of one or a plurality of quantum operations is a number between 0 and 1 (or a percentage equivalent to said number, i.e. in particular 0% for 0 and 100% for 1) characterizing the proximity between a result obtained during the implementation of said one or a plurality of quantum operations with a quantum processor (for a given allocation configuration) and a result obtained during the implementation of the same operations with a perfect processor. In practice, e.g. if the fidelity of a predetermined operation of the quantum algorithm performed with the quantum processor is 99%, it means that there is only a 1% probability of obtaining an erroneous result after performing said operation.

The fidelity of the quantum algorithm can thus be calculated, for a given allocation configuration, from the fidelities of each operation on the physical qubits taking place during the implementation of the quantum algorithm.

In the present description, the fidelity of an allocation configuration refers to the fidelity of the quantum algorithm for said allocation configuration.

Fidelity makes it possible to characterize the efficiency of an allocation configuration obtained with the method according to the present description. The above also makes it possible to compare the efficiency of the method according to the present description with other methods of the prior art.

According to one or a plurality of embodiments, steps comprising the allocation of a first logical qubit, the iterative method for allocating the logical qubits remaining to be allocated, and the calculation of a fidelity, are repeated several times so as to obtain a plurality of allocation configurations each having a fidelity, the method further comprising:
the choice of a configuration having higher fidelity among said plurality of allocation configurations.

It is thus possible to repeat the method, or steps of the method, several times, so as to obtain a plurality of allocation configurations with different fidelities, then to advantageously choose the configuration corresponding to the highest fidelity.

It is also possible to repeat the method, or steps of the method, several times, so as to obtain a plurality of allocation configurations with different fidelities and different numbers of exchange operations, then to advantageously choose a configuration according to the fidelity and number of exchange operations.

In one or a plurality of embodiments, the first physical qubit is a physical qubit closest to a geometric center of the quantum register.

In this way it is possible to maximize the number of candidate physical qubits available for allocations of other logical qubits of the quantum algorithm.

According to one or a plurality of embodiments, the number of logical qubits of said quantum algorithm allocated to physical qubits of the quantum processor is greater than or equal to about 50.

According to one or a plurality of embodiments, the number of physical qubits of said quantum processor is greater than or equal to about twice the number of logical qubits of said quantum algorithm.

For a quantum algorithm to be implemented in a quantum processor, we will seek to have a number of physical qubits of the processor greater than or equal to the number of logical qubits to be allocated from the quantum algorithm. In particular, it can be advantageous to have a number of physical qubits at least greater than or equal to about twice the number of logical qubits in order to increase the number of possible configurations for allocating logical qubits to physical qubits of the processor.

According to one or a plurality of embodiments, one and/or the other of said first and second random choices are made using a probability distribution among the following: exponential distribution, Poisson distribution, piecewise linear distribution, piecewise constant distribution, Beta law, Gamma law, Levy law.

According to one or a plurality of embodiments, said score is further calculated from a weighting of the logical operations, said weighting being chosen according to the type of logical operation between said candidate logical qubit and the logical qubits already allocated to the physical qubits which are linked, in the connectivity graph, to said candidate physical qubit.

The applicant has shown that weighting makes it possible to impose a hierarchy of importance between types of logical operations of the algorithm.

According to one or a plurality of embodiments, said quantum algorithm is among the following: Shor algorithm, Grover algorithm, QAOA (Quantum approximate optimization algorithm), VQE (Variational Quantum Eigensolver) algorithm, quantum Fourier transform, HHL (Harrow, Hassidim, Lloyd) algorithm.

The applicant has shown that the method according to the present description can be used for allocating logical qubits of a quantum algorithm to different types of physical qubits, e.g. neutral atoms, ions or superconducting circuits.

The applicant has shown that the method according to the present description can be used for allocating logical qubits of a quantum algorithm to physical qubits arranged according to an architecture described by a non-directed diagram.

According to one or a plurality of embodiments, the number of neutral atoms of said architecture is greater than or equal to about 100.

According to a second aspect, the present description relates to a method for optimizing an architecture of a neutral-atom quantum processor, comprising:
- the implementation, for a plurality of architectures of the quantum processor, of the allocation method according to the first aspect wherein said physical qubits are neutral atoms; and
- the comparison of said architectures according to a number of exchange operations.

According to a third aspect, the present description relates to a method for optimizing an architecture of a neutral-atom quantum processor, comprising:
- the implementation, for a plurality of architectures of the quantum processor, of the allocation method according to the first aspect wherein said physical qubits are neutral atoms; and
- the comparison of said architectures depending upon a fidelity.

The applicant has shown that it is possible to use the method for comparing different architectures of a quantum register for the implementation of a given quantum algorithm. To this end, the method according to the first aspect is used several times for allocating the logical qubits of a given quantum algorithm to a plurality of connectivity graphs corresponding to a plurality of different architectures of a quantum register. The allocation configurations obtained with the method are then compared by calculating a number of exchange operations or a fidelity corresponding to each configuration.

Advantageously, the architecture of the quantum register corresponding to a configuration with the smallest number of exchange operations and/or the highest fidelity, is chosen for implementing the quantum algorithm. In this way it is possible to optimize an architecture of a quantum register according to the quantum algorithm to be implemented with the quantum processor.

According to a fourth aspect, the present description relates to a computer program comprising program code instructions for executing the steps of a method according to the first aspect, when said computer program is executed by a data processor.

According to a fifth aspect, the present description relates to a quantum data processing system comprising:
- an experimental system comprising physical qubits arranged according to a given architecture; and
- a conventional processor configured for the implementation of the steps of a method according to the first aspect.

BRIEF DESCRIPTION OF FIGURES

Other advantages and features of the invention will become apparent from the description, illustrated by the following figures.

DETAILED DESCRIPTION OF THE INVENTION

The present description is made with reference to functions, functional units, entities, block diagrams and flowcharts which describe different embodiments of methods, systems and programs. Each function, functional unit, entity, step in a flowchart can be implemented by software, hardware, firmware, microcode or any appropriate combination of such technologies. When software is used, functions, functional units, entities or steps can be implemented by computer program instructions or software code. Such instructions can be stored or sent to a computer-readable storage medium and/or be executed by a computer in order to implement said functions, functional units, entities or steps The different embodiments and aspects described below can be combined or simplified in multiple ways. In particular, the steps of the different methods can be repeated, executed in parallel, or executed by different computer entities.

Only certain embodiments of examples are described in detail in order to make the presentation clear, but such examples are not intended to limit the general scope of the principles emerging from the description taken as a whole.

Figure 1:
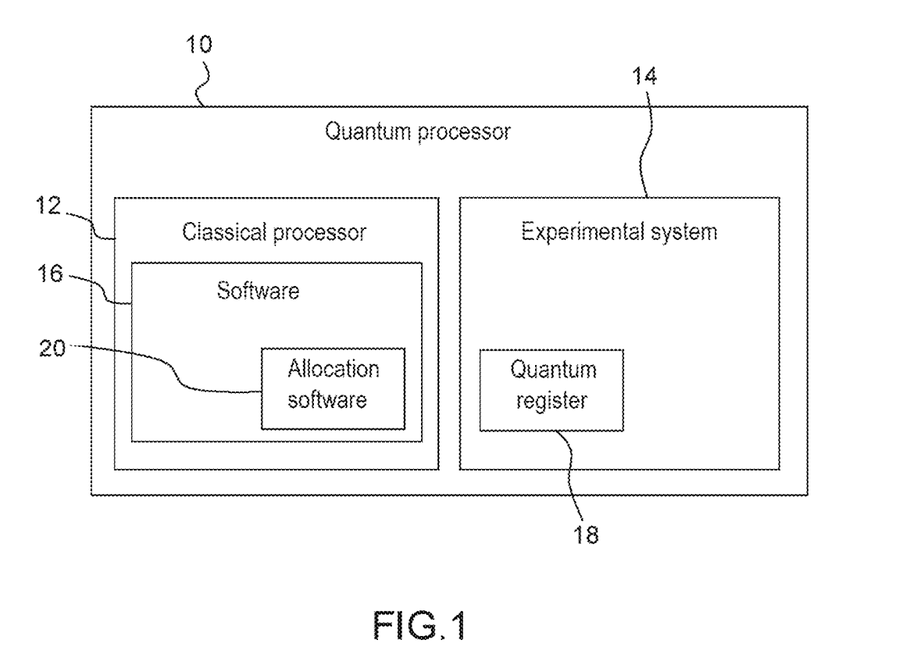
FIG. 1, represents an example of a quantum processor according to the present description.

FIG. 1 schematically represents an example of an embodiment of a system 10 for quantum data processing (also called quantum processor or QPU after the English expression "Quantum Processing Unit").

In one or a plurality of embodiments, the system 10 comprises a conventional processor 12 (hereinafter "computer") and an experimental system 14. The system 10 is configured for processing data in a quantum manner using the computer 12 and the experimental system 14. The data to be processed are formatted and supplied to the experimental system 14 via the computer 12. Once processed by the experimental system 14, the data are received by the computer 12 where the data can be used or supplied to a user of the system 10.

The experimental system 14 is a set of experimental means configured for individually handling physical entities distributed according to a certain architecture and the quantum state of which can be used as an information medium in order to implement the quantum algorithm in practice. Such physical entities are called physical qubits.

The set of the physical entities (identified by 18 in FIG. 1) is called quantum register.

In one or a plurality of embodiments, the physical qubits are neutral atoms, e.g., but not limited to, Rubidium, Strontium, Ytterbium, Cesium or Calcium atoms.

The experimental system 14 can then be a system for trapping individual atoms using optical tweezers. Such a trapping system can comprise e.g., in a known manner, a vacuum chamber, a cryostat, active and passive optical components, magnetic systems and electronic systems.

In other embodiments, the physical qubits can be trapped ions, Josephson junction-based superconducting qubits, or qubits on semiconductor materials, e.g. on silicon.

The computer 12 generally comprises computer programs or software 16 configured for controlling the implementation of a quantum algorithm in the quantum register 18 and in particular comprises an allocation software 20 configured for implementing a method 200 for allocating logical qubits of the quantum algorithm to physical qubits of the quantum algorithm quantum register 18. Once implemented in the quantum register 18, the quantum algorithm can be applied to the data.

Figure 2:
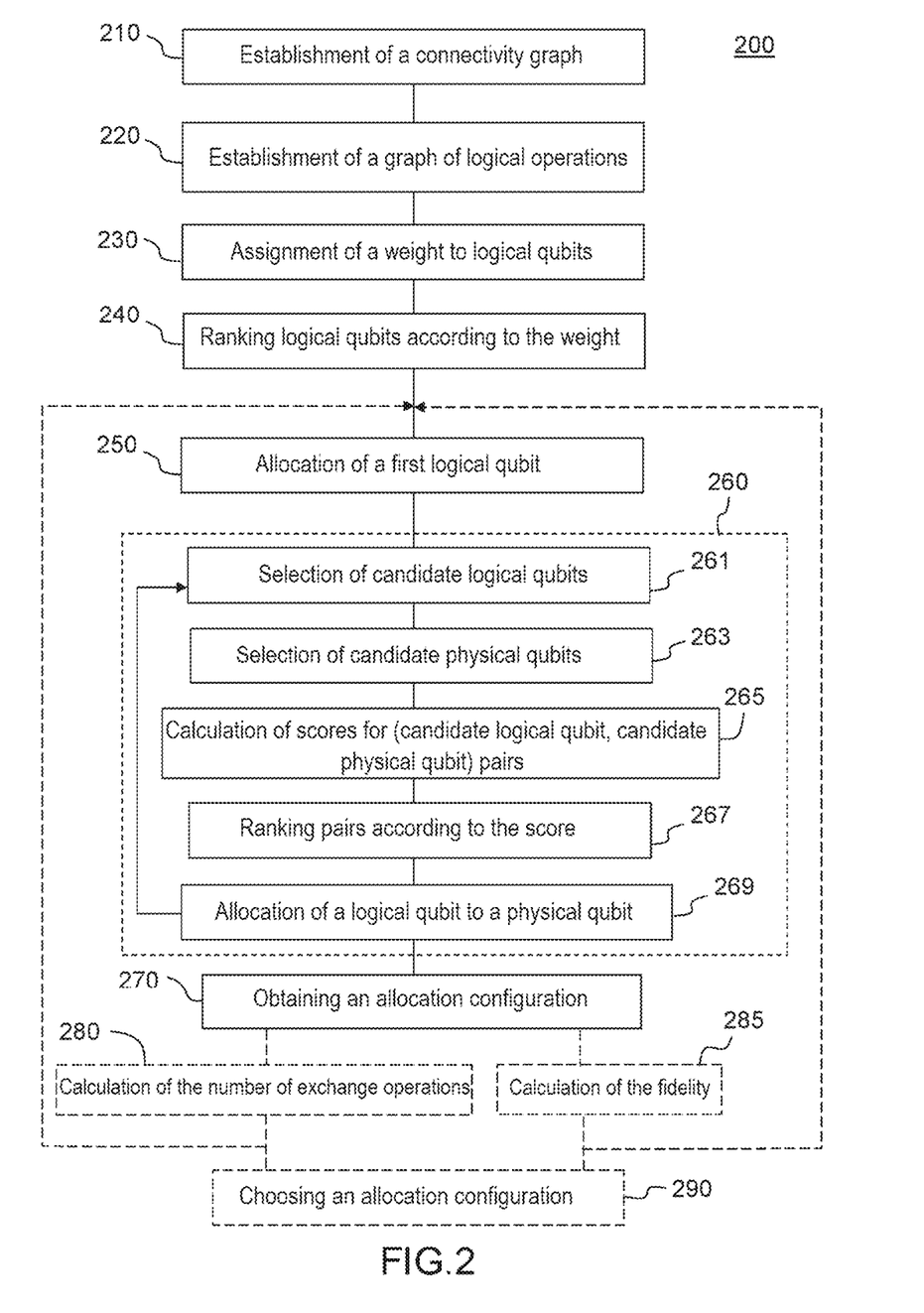
FIG. 2, represents a flowchart of an example of a method for allocating logical qubits of a quantum algorithm to physical qubits of a quantum register, according to the present description.

FIG. 2 shows an example of an embodiment of a method 200 for allocating logical qubits of a quantum algorithm to physical qubits of a quantum processor according to the present description. Although the steps of said method are presented sequentially, at least some of the steps can be omitted or performed in a different order or can be performed in parallel or combined to form a single step.

The method 200 aims to allocate either all of the logical qubits of the quantum algorithm or a plurality of logical qubits among the logical qubits of the algorithm, to a plurality of physical qubits of the quantum processor among the totality of the physical qubits of the quantum processor (which form the quantum register).

Such an allocation corresponds to a choice of a correspondence between each of the logical qubits to be allocated and a physical qubit; thus, at the end of the allocation, the number of physical qubits allocated is equal to the number of logical qubits allocated.

When the method 200 aims to allocate a plurality of logical qubits of the quantum algorithm, the logical qubits of the plurality are logical qubits involved in a truncated part of the quantum algorithm comprising only a given number of logical gates. In such case, at the end of the method 200, the logical qubits which have not been allocated, i.e. the logical qubits involved in the rest of the algorithm, can e.g. be allocated by other allocation methods.

In one or a plurality of embodiments, the number of physical qubits of the quantum processor 10 is greater than twice the number of logical qubits of the quantum algorithm.

In one or a plurality of embodiments, the number of physical qubits of the quantum processor 10 is greater than or equal to 50, preferentially greater than or equal to 100, preferentially greater than 500.

In a first step 210, a connectivity graph is established from the physical qubit layout architecture of the quantum register wherein the quantum algorithm is intended to be implemented. An example of a connectivity graph will be described in more detail with reference to FIG. 3.

In a second step 220, a graph of the logical operations is established from the quantum algorithm intended to be implemented in the quantum register. An example of a graph of logical operations will be described in more detail with reference to FIG. 4.

In the case where method 200 is used for allocating only a plurality of logical qubits corresponding to a truncated part of the quantum algorithm, the graph of logical operations is established from the truncated part of the algorithm.

In a third step 230, a weight is assigned to the logical qubits of the graph of logical operations. The weight is an integer value which is assigned to each logical qubit of the graph of logical operations. The weight of a logical qubit is equal to the total number of logical operations wherein the logical qubit is involved within the quantum algorithm or the truncated part of the quantum algorithm. The weight can thus be used for establishing a hierarchy of importance between the possible logical qubits to be allocated and for determining which logical qubits are the most preferential for the first allocation.

In a fourth step 240, the logical qubits of the graph of logical operations are ranked according to the weights thereof, e.g. in descending order of weight, so as to form an ordered list of logical qubits. When several logical qubits have the same weight, same are ranked at the same level in the list.

In a fifth step 250, a first logical qubit is chosen and allocated to a first physical qubit of the connectivity graph.

The first logical qubit is chosen from among the logical qubits of the graph of logical operations, by a first random choice favoring a logical qubit having a greatest weight.

In practice, the first random choice is made using a probabilistic distribution (also called random distribution) in order to choose from the ordered list of logical qubits established during the step 240, a first logical qubit to be allocated.

An index e.g. from a list of logical qubits ordered in descending order of weight is drawn according to a descending random distribution. The logical qubit corresponding to the index drawn is the qubit chosen from the ordered list of possible logical qubits. The use of a decreasing random distribution will favor the drawing of the logical qubits ranked at the beginning of the list compared to the logical qubits ranked at the end of the list. Since the list is ordered in descending order of weight, the logical qubits ranked at the beginning of the list are also the logical qubits which have larger weight.

The first physical qubit can be chosen in different ways. In particular, the first physical qubit can be chosen by selecting a physical qubit which is closest to the geometric center of the connectivity graph.

When a plurality of physical qubits are closest at the geometric center of the connectivity graph, each of the physical qubits can be chosen as the first physical qubit.

The allocation method 200 further comprises an iterative procedure step 260, wherein the steps identified by 261, 263, 265, 267 and 269 in FIG. 2) are repeated several times until the last logical qubit to be allocated is allocated among all the logical qubits of the quantum algorithm or among the plurality of logical qubits of the quantum algorithm.

During the step 261, one or a plurality of candidate logical qubits are selected from among the logical qubits which have not been allocated to a physical qubit.

The selected candidate logical qubit(s) are the logical qubits which are involved in a common quantum logical operation with a logical qubit already allocated, e.g. with the first logical qubit. Thereby, because of the construction of the graph of logical operations, the candidate logical qubits are the logical qubits which have at least one link with the logical qubits already allocated in the graph of logical operations.

During the step 263, one or a plurality of candidate physical qubits are selected from among the physical qubits of the connectivity graph to which no logical qubit has been allocated (also called "unallocated physical qubits" in the present description).

The selected candidate physical qubit(s) are the physical qubits which can interact with at least one of the physical qubits to which logical qubits have been allocated, e.g. the first physical qubit. Because of the construction of the connectivity graph, the candidate physical qubits are the physical qubits which are linked to at least one physical qubit to which a logical qubit has been allocated.

In the case of a quantum register characterized by a blocking radius, the candidate physical qubits are in particular the physical qubits located approximately at a distance less than (or equal to) the blocking radius of at least one physical qubit to which a logical qubit was allocated.

During the step 265, a score $S(q, p)$ is associated with each pair $(q, p)$ comprising a candidate logical qubit q and a candidate physical qubit p. For a set of n candidate logical qubits and m candidate physical qubits, there are hence n*m pairs associated with n*m scores.

The score $S(q, p)$ is equal to the number of logical operations between said candidate logical qubit and the logical qubits already allocated to the physical qubits linked in the connectivity graph to said candidate physical qubit.

The score $S(q, p)$ also corresponds to the number of logical operations of the algorithm which can actually be performed by a single interaction between physical qubits in the quantum register if q is allocated to p. The score is thus linked to the hypothetical number of exchange operations which would have to be introduced if q were not allocated to p.

The score thus makes it possible to make a hierarchy of the most preferential allocations with respect to the exchange operations and thus of the efficiency of the implementation of the quantum algorithm.

In particular, if a score S obtained for a pair (q, p) is strictly greater than a score S' obtained for a pair (q', p'), it is preferential to allocate q to p rather than to allocate q' to p'.

Moreover, if the score S is equal to the score S', it is also preferential to allocate q to p than to allocate q' to p'.

The applicant has shown that it is also possible to introduce a weighting of the score, i.e. a modification of the score by a factor, depending upon the types of logical operations between said candidate logical qubit and the logical qubits already allocated to the physical qubits linked in the connectivity graph to said candidate physical qubit. The factor reflects, e.g., the variable importance of a logical gate among the logical gates of the quantum algorithm. If a gate is important, it can in particular be judicious that the physical production of the logical gate in the quantum processor does not involve any exchange operation during the implementation of the quantum algorithm.

During the step 267, the pairs of candidate qubits are ranked according to the scores thereof so as to form an ordered list of candidate pairs and thus establish a hierarchy between the most preferential allocations. The pairs of candidate qubits e.g. are ranked in descending order of score.

The steps 265, 267 advantageously make it possible to indicate the preferential allocations for reducing the number of exchange operations. An advantage of the steps 265, 267 is to take into account the result of the allocations already made in order to choose the following allocations.

Such taking into account of the allocation history is thus particularly synergic with the fact that steps 261, 263, 265, 267, 269 form an iterative procedure 260 repeated a plurality of times until the allocation of the last logical qubit of the quantum algorithm (or the last logical qubit of the plurality of logical qubits to be allocated).

During the step 269, a candidate logical qubit q is allocated to a candidate physical qubit p, q and p belonging to a chosen pair (q,p).

The chosen pair is chosen by a second random choice favoring a pair having a higher score amongst the ordered list of candidate pairs established during the step 267.

In practice, the second random choice is made using a probability distribution.

In one or a plurality of embodiments, the random choice of the step 269 (second random choice) uses the same distributions as the random choice of the step 250 (first random choice).

A decreasing random distribution e.g. is used for drawing a candidate pair from a list of candidate pairs ordered in descending order of score.

The random choice of the step 269 thus imparts a random character to the step 269 which makes it possible to obtain different allocations although the procedure 200 is used for allocating the logical qubits of the same algorithm (or of the same plurality of logical qubits of an algorithm) to physical qubits of the same processor.

The above distinguishes in particular the method according to the present description from the methods of the prior art, in particular from the deterministic methods disclosed in Siraichi et al.

At the end of the iterative procedure 260, i.e. when all the logical qubits of the quantum algorithm, or all the logical qubits of a plurality of logical qubits of the algorithm, have been allocated to physical qubits of the quantum processor, an allocation configuration is obtained (the step 270).

Optionally, during the step 280, a number of exchange operations for the allocation configuration obtained is calculated. The number of exchange operations characterizes the efficiency of a given allocation configuration.

Thus, an allocation configuration C1 having a number of exchange operations strictly less than an allocation configuration C2 means that the allocation configuration C1 is more efficient than the allocation configuration C2, and vice versa.

The above is due to the fact that, the higher the number of exchange operations an allocation configuration has, the more possibilities of errors in the implementation of the quantum algorithm.

Alternatively or additionally during the step 280, it is possible to characterize the efficiency of an allocation configuration by a fidelity calculation 285.

Fidelity is a number between 0 and 1 which quantifies a measure of proximity of the result of the quantum algorithm to the result which would be obtained with an ideal processor wherein all interactions between physical qubits are perfect and error-free. The closer the fidelity is to 1, the more efficient the corresponding allocation configuration.

For an allocation configuration, the larger the number of exchange operations, the more same increases the possibility of errors when implementing the quantum algorithm compared to what would happen in an ideally perfect processor, thus degrading fidelity. Fidelity can thus be another way of evaluating the number of exchange operations in an allocation configuration.

In practice, to evaluate the fidelity of an allocation configuration, the interactions between physical qubits embodying the effect of quantum gates can be calibrated experimentally and the individual fidelity of each gate can be measured. The individual fidelities are then multiplied to obtain the fidelity characterizing the allocation configuration.

It is not always possible to experimentally calibrate all the interactions between physical qubits which take place during the implementation of the algorithm. Fidelity can thus sometimes be estimated from the number of exchange operations. It is considered e.g. that the addition of an exchange operation corresponds to a modification, by a factor f, of a reference fidelity chosen beforehand, and thus that the addition of k exchange operations corresponds to a degradation of the reference fidelity by a factor $f^k$.

Because of the randomness of the steps 250, 269, it can be particularly advantageous to repeat the step 250 and the iterative procedure 260 several times so as to try several allocation configurations, then to make a deterministic choice 290 of a better configuration, based on the calculation 280 of the number of exchange operations; or the fidelity calculation 285; or on a combination of the calculations 280, 285.

Figure 3:
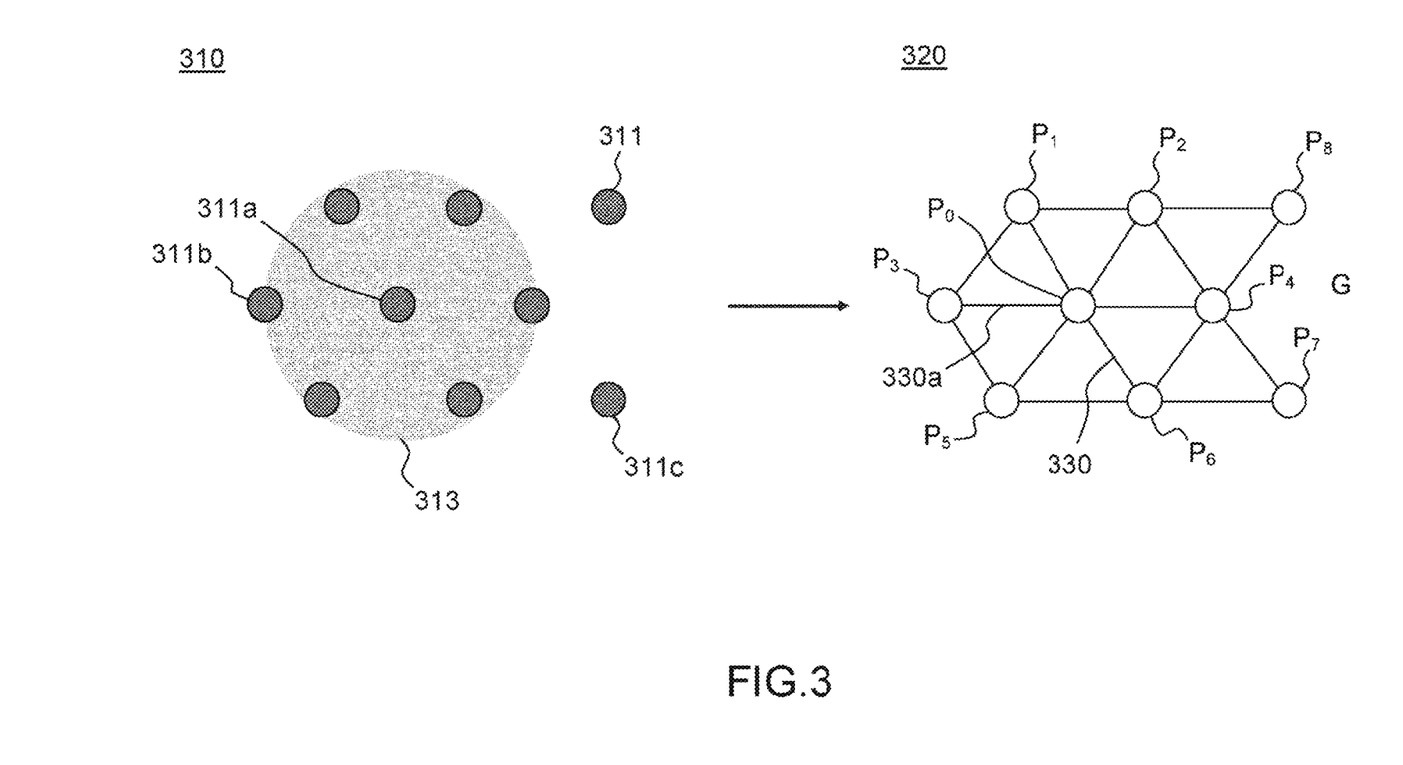
FIG. 3, represents an example of an architecture of a quantum register and a connectivity graph established from said architecture, according to the present description.

FIG. 3 represents, as an illustration, an example of architecture 310 of a quantum register and an example of a connectivity graph 320, denoted by G, associated with said architecture 310.

The architecture 310 of a quantum register is a schematic representation of the geometric layout of the physical qubits 311 of the quantum register. Such layout depends in particular on the experimental constraints of the quantum register.

In the case of a quantum register comprising neutral atoms, the neutral atoms can be placed on different types of 2-dimensional lattices (e.g. square, hexagonal or triangular lattices) and 3-dimensional lattices.

In the case of a quantum register e.g. comprising neutral atoms on a 2D lattice, the constraints to be satisfied in the layout are:
- a minimum distance between two neighboring atoms of about 2 to 3 microns; and
- a surface occupied by all the atoms of the register, which is contained within a circle of at most a few hundred microns, preferentially one hundred microns.

In certain cases, it is possible to vary (or "reconfigure") the geometric layout by varying experimental parameters of the quantum register.

The possibility of reconfiguring the layout is currently an advantage of quantum registers comprising neutral atoms. The registers comprising superconducting qubits have the geometry thereof fixed during the manufacture thereof and the registers comprising trapped ions are one-dimensional.

In a quantum register, the geometric distances between physical qubits can prevent interactions between physical qubits, so it is possible to define a blocking radius (radius of the disk 313) beyond which two physical qubits can no longer interact.

In the example of FIG. 3, the physical qubits 311 are arranged according to a 2D lattice with triangular mesh. The physical qubit 311a can interact with the physical qubits included at least partially in the disk 313, the radius of which is equal to the blocking radius, but not with the physical qubits outside the disk 313. In particular, the physical qubits 311a can interact with the physical qubit 311b but cannot interact with the physical qubit 311c.

In order to represent schematically both the positions of the physical qubits 311 according to the architecture 310 and the possibilities of interaction between the physical qubits, a connectivity graph 320 is established from the architecture 310. The connectivity graph 320 comprises nodes 321 and links 330. The nodes 321 represent the physical qubits of the architecture 310. The links 330 represent the possibilities of interaction between two physical qubits 321.

As illustrated in FIG. 3, there is a one-to-one correspondence between the physical qubits 311 of the architecture 310 and the nodes 321 of the connectivity graph 320; thereby, in the present description, the term physical qubit will also be used for naming a node. Moreover, since the positions of the physical qubits are fixed for a given architecture of a quantum register, we will speak indifferently of a physical qubit or of the position of a physical qubit for a given architecture.

If the architecture of the register is modified, i.e. if the positions of the physical entities in the register are modified, then the constraints of interaction between physical entities change and we will try to establish a new connectivity graph and to solve again the allocation problem for the new architecture.

Thereby, in the example of connectivity graph 320 shown in FIG. 3, there is a 330a link between the physical qubits p0 and p3, which means that there is a possible interaction between the physical qubits p0 and p3. On the other hand, there are no links between the physical qubits p0 and p7, which means that there is no possible interaction between the two physical qubits. If we want to physically produce a gate involving logical qubits allocated to p0 and p7, we will thus need to use exchange operations with auxiliary physical qubits. The auxiliary physical qubits used in the exchange operations have to form a chain of linked physical qubits ranging from p0 to p7. It is possible e.g. to use two exchange operations: a first exchange operation between the physical qubits p0 and p6, and a second exchange operation between the physical qubits p6 and p7.

Figure 4:
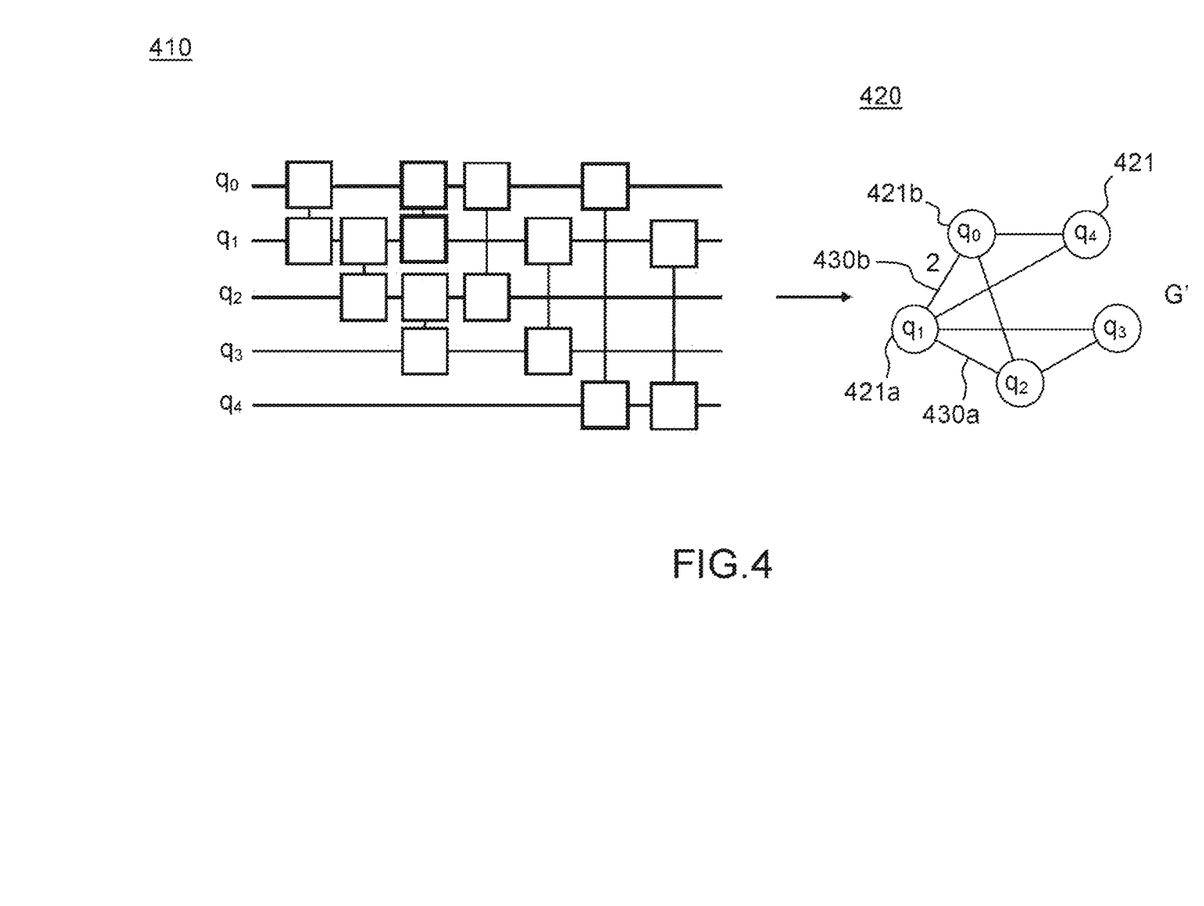
FIG. 4, represents an example of a logical circuit defining a quantum algorithm and a graph of logical operations established from said logical circuit, according to the present description.

FIG. 4 shows as an illustration an example of a logical circuit 410 defining a quantum algorithm and a graph 420 of the logical operations established from said logical circuit 410, according to the present description.

A logical circuit like circuit 410 is a diagram illustrating the decomposition of a quantum algorithm into a successive sequence of quantum logical gates applied to logical qubits.

In the example of FIG. 4, the logical circuit defines a quantum algorithm comprising 5 logical qubits and 8 quantum logical gates.

When the method 200 of the present description is used for allocating only a plurality of logical qubits of a quantum algorithm to logical qubits of a quantum processor, the plurality of logical qubits can be chosen by selecting the logical qubits of a truncated part of the quantum algorithm in the circuit 410, e.g. a truncated part of FIG. 4 which includes the first 5 quantum logical gates and which thus involves only 4 logical qubits among the 5 logical qubits of the algorithm.

In the graph 420 of the logical operations, denoted by G', the nodes 421 represent the logical qubits involved in the quantum algorithm and the links 430 represent the collective quantum logical gates between the logical qubits.

In the example of graph 420 of the logical operations of FIG. 4; there is a link 430a between the qubits q1 and q2, which indicates that the qubits q1 and q2 are involved in a collective gate of the algorithm. On the other hand, there is no link between the qubits q0 and q3, which indicates that the qubits q0 and q3 are not involved in a collective gate of the algorithm.

When two logical qubits occur several times together in collective gates, rather than representing a plurality of links between the two logical qubits, a number is written next to the link between the two logical qubits so as to indicate the number of collective gates wherein the logical qubits are involved together. Such is the case for the logical qubits q0 and q1 which are involved in two collective logical gates, and thus for which a number "2" is written next to the link 430b.

Figure 5:
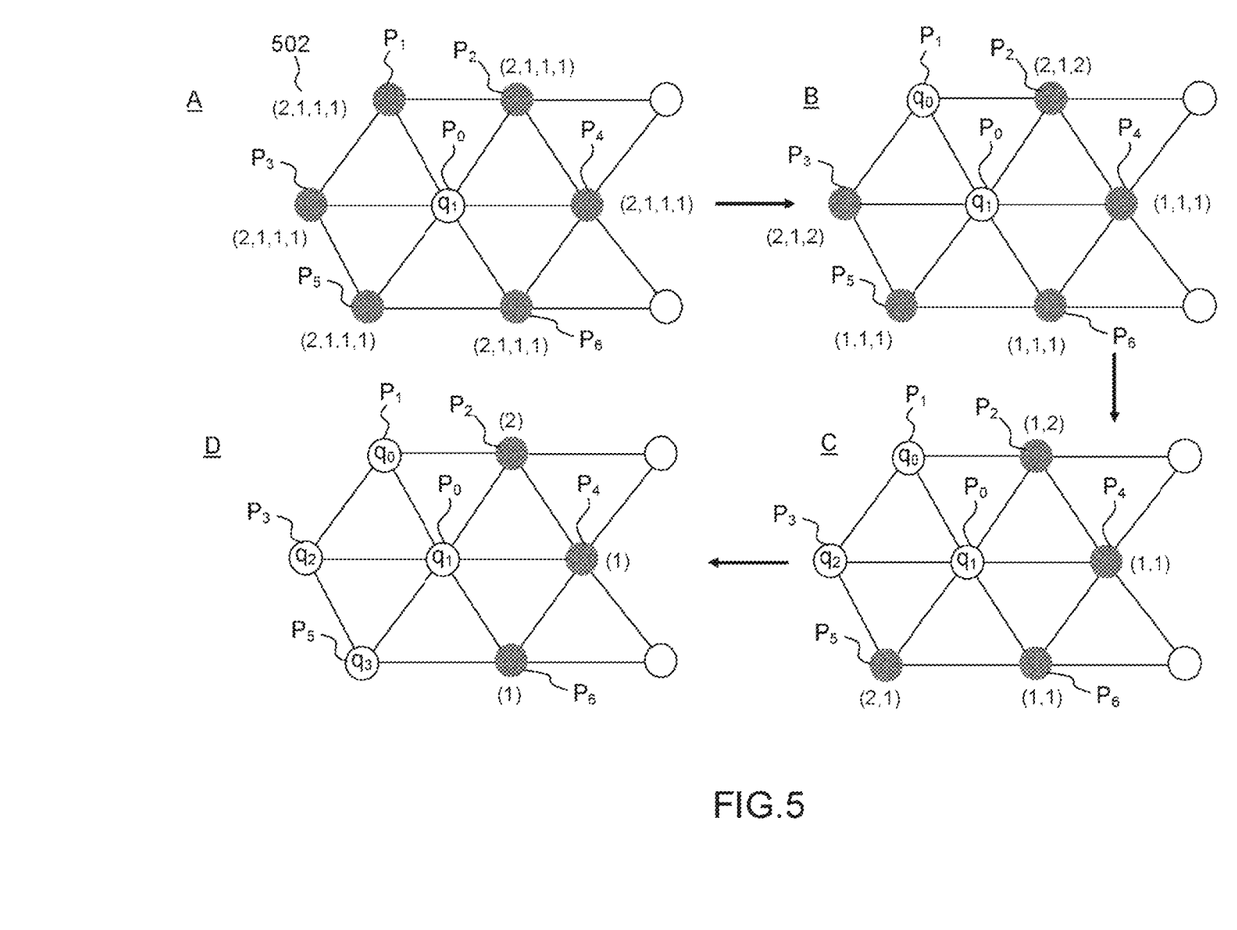
FIG. 5, shows examples of connectivity graphs illustrating a method for allocating logical qubits of a quantum algorithm to physical qubits of a quantum processor, according to the present description.

FIG. 5 shows examples of annotated connectivity graphs illustrating an allocation method 200 as described with reference to FIG. 2, applied to the allocation of the logical qubits of the quantum algorithm described by the graph of logical operations 420 shown in FIG. 4, in an architectural quantum processor described by connectivity graph 320 shown in FIG. 3.

In particular, in FIG. 5, four connectivity graphs (A, B, C, D) are annotated so as to represent the allocation configuration at different steps of the allocation method 200.

Graph A corresponds to an allocation configuration after the step 250.

Graph B corresponds to an allocation configuration after only one iteration of the iterative procedure 260 (i.e. the steps 261, 263, 265, 267, 269 of the procedure 260 have been performed only once each).

Graph C corresponds to an allocation configuration after two iterations of the iterative procedure 260.

Graph D corresponds to an allocation configuration after three iterations of the iterative procedure 260.

Graph A represents the most likely configuration after the step 250 because the logical qubit q1 is the most connected in the graph 420 and thus has the most chance of being chosen during the step 250. Moreover, the physical qubit p0 can be chosen because same is one of the closest to the geometric center of the connectivity graph 320.

The candidate logical qubits are the qubits linked to q1 in the graph 420, i.e. the logical qubits q0, q2, q3, q4.

The candidate physical qubits for the allocation of the next logical qubit among the candidate logical qubits are the physical qubits linked to the physical qubit to which q1 has been allocated, i.e. the physical qubits linked to p0, which are represented in gray: p1, p2, p3, p4, p5, p6.

For each position $p_i$ of the candidate physical qubits, the scores associated with the different possible pairs with the candidate logical qubits (q0, q2, q3, 4) are represented in parentheses in this order.

The scores 502 e.g. of pairs comprising p1, i.e. the scores of the pairs (q0, p1), (q2, p1), (q3, p1) and (q4, p1) are indicated by (2, 1, 1, 1). The above indicates that the pair (q0, p1) has a score of 2, the pair (q2, p1) has a score of 1, the pair (q3, p1) has a score of 1, and the pair (q4, p1) has a score of 1.

In particular, the score of the pair (q0, p1) is 2 because, in the graph 420, the logical qubit q0 is linked twice to the logical qubit allocated to p0, i.e. to the logical qubit q1.

The other scores of the pairs comprising, p2, p3, p4, p5 and p6, respectively, are calculated in the same way and represented around the other candidate physical qubits. It can be seen that 6 pairs have the same higher score equal to 2: (q0, p1); (q0, p2), (q0, p3), (q0, p4), (q0, p5), (q0, p6). So all such pairs will have the same probability of being chosen. The above implies in practice that the candidate logical qubit q0 will have the most chance of being allocated (because same is present in all pairs with the highest score) but that the candidate physical qubits (p1, p2, p3, p4, p5, p6) will all have an equivalent chance of being chosen. Graph B thus represents a configuration wherein q0 has been allocated to p1, which is one of the most probable configurations after having performed the procedure 460 given the configuration of graph A and the scores corresponding to the different pairs.

According to the same principle, graph C represents a probable configuration wherein q2 has been allocated to p3, after having performed the procedure 260 a second time, starting from the configuration of graph B.

According to the same principle, graph D represents a probable configuration wherein q3 has been allocated to p5, after having performed the procedure 260 a third time, starting from the configuration of graph C.

On graph D, the scores indicate that it is probable that a new application of the procedure 260 results in the allocation of q4 to p2.

The steps of the iterative allocation procedure will be repeated until the allocation of the last logical qubit remaining to be allocated. In particular, if it is desired to allocate all the logical qubits of the quantum algorithm defined in FIG. 4, the allocation procedure will be repeated once.

Although described through a certain number of examples of embodiments, the methods for allocating logical qubits according to the present description comprise different variants, modifications and improvements which will appear as obvious to a person skilled in the art, with the proviso that the different variants, modifications and improvements are part of the scope of the invention as defined by the following claims.

The invention claimed is:

1. A method for allocating logical qubits of a quantum algorithm to physical qubits of a quantum processor arranged according to a given architecture, said method comprising:
   the establishment, from said architecture, of a connectivity graph, each node of said graph representing a position of a physical qubit and each link representing a possibility of interaction between two physical qubits;
   the establishment, from said quantum algorithm, of a graph of logical operations, each node of said graph representing a logical qubit and each link of said graph representing a quantum logical gate between two logical qubits;

the assignment of a weight to each logical qubit of said graph of logical operations, determined according to the total number of logical gates involving said logical qubit;

the ranking of logical qubits according to weight;

the allocation of a first logical qubit to a first physical qubit of the quantum processor, said first logical qubit being chosen by a first random choice favoring a logical qubit having the greatest weight;

an iterative procedure for allocating the logical qubits remaining to be allocated comprising:

the selection of candidate logical qubits, said candidate logical qubits being, among the logical qubits remaining to be allocated, logical qubits linked in the graph of logical operations to at least one of the already allocated logical qubits;

the selection of candidate physical qubits, said candidate physical qubits being, among the physical qubits remaining to be allocated, physical qubits linked in the connectivity graph to at least one of the already allocated physical qubits;

for each pair of candidate logical qubit and candidate physical qubit, the calculation of a score, each score being determined, for a possible allocation of said candidate logical qubit to said candidate physical qubit, by the number of logical operations between said candidate logical qubit and the logical qubits already allocated to the physical qubits linked in the connectivity graph to said candidate physical qubit;

the ranking of pairs of candidate logical qubits and candidate physical qubits according to the score; and the allocation of a logical qubit to a physical qubit, said logical qubit and said physical qubit being selected by a second random selection favoring the candidate logical qubit and the candidate physical qubit of a pair of candidate physical qubit and candidate logical qubit having a higher score among said pairs of candidate logical qubits and candidate physical qubits;

the reproduction of said iterative allocation procedure until the allocation of the last logical qubit remaining to be allocated, thus resulting in producing a configuration for allocating logical qubits of the quantum algorithm to physical qubits of the quantum processor.

2. The method according to claim 1, further comprising, after the allocation of the last logical qubit, the calculation of a number of exchange operations from said allocation configuration.

3. A method of optimizing an architecture of a neutral-atom quantum processor comprising:

the implementation, for a plurality of architectures of the quantum processor, of the allocation method according to claim 2, wherein said physical qubits are neutral atoms; and a comparison of said architectures according to a number of exchange operations.

4. The method according to claim 2, further comprising, after the allocation of the last logical qubit, the calculation of a fidelity of the quantum algorithm.

5. Method according to claim 2, wherein said first physical qubit is a physical qubit closest to a geometric center of a quantum register.

6. The method according to claim 2, wherein steps comprising the allocation of a first logical qubit, the iterative procedure of allocating the logical qubits remaining to be allocated and the calculation of a number of exchange operations are repeated several times so as to obtain a plurality of allocation configurations each with a number of exchange operations, the method further comprising:

the choice of a configuration having a smaller number of exchange operations among said plurality of allocation configurations.

7. The method according to claim 6, further comprising, after the allocation of the last logical qubit, the calculation of a fidelity of the quantum algorithm.

8. The method according to claim 1, further comprising, after the allocation of the last logical qubit, the calculation of a fidelity of the quantum algorithm.

9. The method according to claim 8, wherein steps comprising the allocation of a first logical qubit, the iterative method for allocating the logical qubits remaining to be allocated, and the calculation of a fidelity, are repeated several times so as to obtain a plurality of allocation configurations each having a fidelity, the method further comprising:

the choice of a configuration having higher fidelity among said plurality of allocation configurations.

10. A method of optimizing an architecture of a neutral-atom quantum processor comprising:

the implementation, for a plurality of architectures of the quantum processor, of the allocation method according to claim 8, wherein said physical qubits are neutral atoms; and a comparison of said architectures depending upon a fidelity of the quantum algorithm.

11. The method according to claim 1, wherein said first physical qubit is a physical qubit closest to a geometric center of a quantum register.

12. The method according to claim 1, wherein a number of logical qubits of said quantum algorithm allocated to physical qubits of the quantum processor is greater than or equal to 50.

13. The method according to claim 1, wherein the number of physical qubits of said quantum processor is greater than or equal to twice a number of logical qubits of said quantum algorithm.

14. The method according to claim 1, wherein one and/or the other of said first and second random choices are made using a probability distribution among the following: exponential distribution, Poisson distribution, piecewise linear distribution, piecewise constant distribution, Beta law, Gamma law, Lévy law.

15. The method according to claim 1, wherein said score is further calculated from a weighting of the logical operations, said weighting being chosen according to the type of logical operation between said candidate logical qubit and the logical qubits already allocated to the physical qubits which are linked, in the connectivity graph, to said candidate physical qubit.

16. The method according to claim 1, wherein said quantum algorithm is an algorithm selected from the following algorithms: Shor algorithm, Grover algorithm, Quantum approximation Optimization Algorithm (QAOA), Variational Quantum Eigensolver (VQE) algorithm, quantum Fourier transform, Harrow, Hassidim, Lloyd (HHL) algorithm.

17. The method according to claim 1, wherein said physical qubits are neutral atoms.

18. The method according to claim 17, wherein the number of neutral atoms of said architecture is greater than or equal to 100.

19. A non-transitory computer-readable medium on which is stored a computer program comprising program code instructions for executing the steps of a method according to claim 1 when said computer program is executed by a data processor.

20. A quantum data processing system comprising:
 an first system comprising physical qubits arranged according to a given architecture; and
 a classical processor configured for implementing steps of a method according to claim 1.

\* \* \* \* \*